United States Patent Office 3,288,211
Patented Nov. 29, 1966

3,288,211
WATER FLOODING PROCESS
Norris Johnston, 4222 Thacher Road, Ojai, Calif.
No Drawing. Filed Feb. 13, 1964, Ser. No. 344,540
6 Claims. (Cl. 166—9)

This invention relates to the secondary recovery of oil from underground formations by water flooding, and more particularly to a means of promoting the flow of water in the aforesaid process.

In the recovery of oil from underground formations, in the early part of the history of a given oil field, the oil generally flows to the surface by operation of pressure contained within the oil bearing formation. Later, as this pressure is exhausted by withdrawal of oil and gas, it is necessary to pump the oil to the surface. Both natural flow and pumping are among the so-called primary processes of oil production. Eventually, in the development of a given oil field, long continued pumping reaches a stage where it may become uneconomic; and in any case, the simple process of extracting oil from an underground formation by withdrawing it through a well by no means extracts from the formation all of the recoverable oil originally contained therein. Even on long continued pumping, to the point of apparent exhaustion of the field, oil remains trapped in the interstices of the formation. Recourse is then had to the so-called secondary methods of production. These include relatively new processes such as in situ combustion, miscible phase displacement, and others. However, the oldest and currently still the most widely employed method of secondary oil recovery is to drill one or more input wells more or less surrounding one or several producing, viz. output wells, and force water, and especially salt water, into the input wells so as to create what may be considered an artificial water drive, so that the residual oil or at least a large portion thereof in the pressure-depleted oil bearing formation is pushed towards the output well or wells, whence it is recovered by ordinary methods such as pumping. The output wells in most cases are the same wells which were drilled in the earlier history of the field, and which had been used during the flowing and pumping steps of primary production from the same formation.

The process just described appears simple enough, but there are several practical difficulties which are commonly encountered, and which have been overcome only partially in spite of many years of research and experience in secondary oil recovery by the water flooding process. In the first place, it is, in general, not feasible to use fresh water for the flooding operation, since this tends to swell and dislodge clays and other fine particles in the oil-bearing formation. Rather, it is desirable to use water at least as saline as the interstitial water originally present in the formation, which is often about as saline as sea water. It is common in this art to obtain a supply of such salt water from wells drilled for the purpose to appropriate depths where salt water may be found.

A second difficulty commonly encountered is that even when water of appropriate salinity is obtained and used, the water flooding process tends to slow down and may come to a complete halt as a result of subsurface plugging. Probably the commonest cause of such plugging is the proliferation of bacteria and related microorganisms in the water used for flooding. Because of the anaerobic conditions naturally prevailing, the bacteria tend to be anaerobic in nature. Typical bacterial types encountered, especially where plugging is a problem, are various species of Crenothrix, Gallionella, and Actinomycetes, which are filamentous bacteria; various species of Desulfovibrio bacteria; various Pseudomonas species; and fungi such as various species of Penicillium and Aspergillus. This listing of types is not complete by any means, however, and depending upon the particularities of the environment, many other types of bacteria and related microorganisms may bring about plugging of the type described.

The accepted method of combating microbiological plugging is to incorporate in the water used for flooding a suitable bactericide, of which several types have gained acceptance. These are simply various chemical compounds, such as chlorinated phenols, and related phenyl derivatives, long chain alkyl quaternary ammonium compounds, and the like, all of the general type known to the laity as "disinfectants." Filtration of the water prior to injection is also of assistance, as this not only removes sediments and like plugging agents, but when properly carried out is able to filter out microorganisms as well. Generally, both techniques are used together.

Under ideal conditions, the use of bactericides and like disinfectants with or without conjoint filtration is successful, but unfortunately, perfection is difficult to obtain and maintain, and any proliferation of microorganisms in spite of the treatments mentioned will plug up the injected strata in a fashion which is generally considered to be irreversible. There are many reasons for these commonly accepted treatments failing short of the ideal. Momentary lapse on the part of supervisory personnel can allow the concentration of the disinfectant to fall below an effective level. A generally rising temperature as summer approaches may render a treatment which is adequate for wintertime conditions no longer effective. Again, the initial effect of the disinfectant may be simply to kill off the most sensitive microorganisms, and with the passage of time, the resistant microorganisms eventually proliferate and take over. Whatever may be the reasons for failure, it is neverethless true that plugging by microorganisms still takes place in spite of the counter measures described.

An object of the present invention is to provide a method for overcoming subsurface plugging by microorganisms. Another object of the invention is to provide a novel treatment of input water in secondary recovery operations by water flooding. Other objects of the invention will appear as the description thereof proceeds.

Generally speaking and in accordance with illustrative embodiments of my invention, in a water flooding process of the general type described, in which water is forced into at least one input well so as to push oil in an oil-bearing formation to at least one output well, I include with said water an enzyme, or indeed a mixture of enzymes, chosen from the class which consists of proteases, cellulases, hemicellulases, chitinases, amyloglucosidases, polygalacturonidases and like enzymes. The inclusion of the enzyme or enzyme mixture with the water is maintained for a long enough period so that the bacterial or other microbiological plugging which may have been present in the formation or formations associated with the flooding process is appreciably ameliorated; or indeed, even where no such plugging is manifest, I may carry out the enzyme or enzyme mixture inclusion step periodically so as to clean up the associated formation and thus avoid any damaging plugging.

The water with which the enzyme or enzyme mixture is included will in general be the water ordinarily used in the flooding process, and as mentioned hereinabove, flooding waters are generally more or less saline, although not always so; and moreover may already have been processed by filtration, heating, chilling, treatment with corrosion inhibitors, treatment with bactericides, and the like, all of which treatments are well known to those skilled in the art.

The amount of enzyme or enzyme mixture which I use will in general be dictated by the particular conditions obtaining. Thus, if a first-time treatment of a badly plugged formation is involved, I may use a relatively heavy concentration of enzyme, indeed as high as 2% by weight. On the other hand, for subsequent treatments, where the plugging has been reduced or eliminated, lesser concentrations may be used, for example, 1/20 to 1/2% by weight. Finally, where my inventive process is used primarily for the purpose of preventing any build-up of plugging, and this may well be in connection with other treatments in accordance with good engineering practice such as the use of bactericides, I may use as little as 1/2000%. The concentration may also be varied in accordance with the duration of the inclusion, that is, the duration of the treatment which again will be dictated at least in part by the flow rates involved. These are all factors which will be readily appreciated and can easily be taken into account by a water-flooding engineer or other engineer or operator skilled in the art. Moreover, check tests may be made in the laboratory on the basis of cultures made from samples of water withdrawn from both the input and the output wells, which may be used as a guide for the selection of the best enzyme or enzyme mixture as well as the optimum concentrations to be used. In general, a heavy concentration does no harm and generally is better than a lesser concentration; its disadvantage is of course cost. Indeed, it is a sound statement that any employment of my inventive process at concentrations of about 1/5000% or 1/2000% or greater will do some good, and in general it is a matter of how quickly the operator wants to obtain the desired results.

In general, where microbiological plugging of the type described takes place in water flooding, the bulk of the plugging will occur in and about the input wells, and in general at most a relatively short distance into the formation subject to the water flooding. This is, however, not always the case, and generally speaking the more porous and permeable and indeed fractured the formation involved is, the more diffuse will be the actual site of the plugging. These considerations lead to an optimum treatment for many water flooding projects of including in the water the chosen enzyme or enzyme mixture at the chosen concentration and allowing this to be associated with the input well or wells and to the formation immediately adjacent thereto for as long a period time as is convenient and compatible with the production program for the field. Thus, in those cases where the plugging is indeed close to the face of the input wells, the water containing the enzyme may be allowed to stand in the input wells for some time, for example, for several hours or a day, and although in extreme cases it may be practicable to recover the water by bailing or the like, in general the water flooding will simply be continued, with or without an inclusion of the enzyme in the subsequently used water for a greater or less period of time after the commencement of the treatment in accordance with the invention. Whichever routine is followed, however, I mean to include all of these in the scope of the descriptive language in this disclosure and in the claims, wherein I speak of including an enzyme or mixture of enzymes of the type recited with the water which is forced into the input well in a water flooding process.

The enzymes which can be used are well known to those skilled in industrial biochemistry. For example, among proteolytic enzymes, i.e., proteases, one may use papain, bromelin, or pepsin, although it is considerably less expensive to use a protease commercially prepared generally by bacterial action. For example, I have used with success a protease derived from *Bacillus subtilis*. Proteolytic enzymes are also available commercially which are derived from fungi. I may also use pectinases, which again are commercially available and derived, inter alia from mold fungi. Also of value are cellulases and the more or less related hemicellulases, chitinases, amylo- glucosidases, and polygalacturonidases. Thus, one commercially mixed enzyme is available which includes cellulase and hemicellulase. Hemicellulases are obtained from a wide variety of sources, such as Bacillus and Bacterium species, or from a number of fungal species including Aspergillus, Penicillium, Monilia and Rhizopus.

As an example of the efficacy of the procedure in accordance with my invention, I give some experimental results below, in which sea water removed by a sampling technique from a water flooding project in an oil field in Southern California was treated with several concentrations of a particular proteolytic enzyme obtained commercially under the trade name of Rhozyme B-6, which was derived from *Bacillus subtilis*. The plugging action of the bacterially contaminated sea water from the water flooding project was followed in the laboratory by determining the filtration time for a fixed volume of flow through a filter of the type common in microbiological experimentation, and known as a "Millipore" filter. Two separate series of tests were made, each with its own control, in which the plugging was manifest by a lengthy filter time of several hundred seconds. In each series of tests, the bacterially contaminated sea water had included therewith a small amount of the "Rhozyme B-6" enzyme, and subsequent to such inclusion, for a stated number of hours, the plugging action of the so-treated sea water was determined by filtration as in the case of the control. The Rhozyme B-6 as used consisted of 75% by weight of wood flour and 25% of actual content of active proteolytic enzyme. The said percentages given in the first series of tests hereinbelow were on the basis of the whole Rhozyme B-6. In the second series of tests, the wood flour was removed, variously by decantation or centrifuging but the percentages given are again on the basis of the starting material. As a further control, plain sea water uncontaminated by any bacteria was also tested; this gave a filter time under like conditions of only 4½ seconds.

The results obtained are given in the tabulation below:

| Type of water | Enzyme Treatment | Digestion time, hr. | Filter Time, seconds | Flow Rate, Percent of Control |
|---|---|---|---|---|
| Bacterial sea water (Control) | None | None | 420 | 100 |
| Do | .001% B6 raw | .4 | 400 | 105 |
| Do | .01% B6 raw | 4 | 150 | 230 |
| Do | .1% B6 raw | 4 | 110 | 382 |
| Bacterial sea water second sample (Control) | None | None | 225 | 100 |
| Do | .1% B6 decanted | 4 | 117 | 192 |
| Do | .1% B6 decanted | 24 | 10 | 2,250 |
| Do | .1% B6 centrifuged | 4 | 36 | 625 |
| Plain sea water | None | None | 4.5 | 5,000 |

In the right hand column of the above tabulation, the flow rate as a percentage of the control is given, and it will be seen that enormous increases of flow rate were obtained.

While I do not wish to be bound by any theory of operation, I believe that the successful results obtainable in accordance with the process of my invention may be ascribed to the fact that plugging of the type described is essentially a mechanical one arising from the entrapment of bacterial debris in the interstices of the formation subjected to the water flood. Probably the chief plugging action comes from dead bacteria, and fragments thereof, and I believe that the success of my inventive treatment resides in the fact that this bacterial and like microbiological debris and residue is attacked by the enzymes which I use, and to a greater or less extent liquified. Depending upon the nature and type of the debris and of the enzymes used and of their concentration, there may be a reduction in the molecular weight, that is to say, the degree of polymerization of the bacterial cell constitutents, chiefly the walls thereof, extending to a complete reduction to primary building blocks such as glucose and the like. In general, I believe that my process works optimally on moribund and dead bacteria and like microbiological debris; but at the same time I consider these to be the chief materials responsible for the plugging. In favorable cases, the enzymes may even attack like bacteria, and thus they will supplement the bactericidal measures of the prior art already mentioned, which in general will be used in the water flood operation in any case.

I have described my invention with the aid of numerous specific examples, conditions, concentrations and the like; but it will be understood that my invention is a broad one, and numerous variations are permissible within its broad scope, as defined by the claims which follow:

Having described my invention, I claim:

1. In a water flooding process in which water is forced into at least one input well so as to push oil in an oil bearing formation to at least one output well, the step which comprises including with said water an enzyme chosen from the class which consists of proteases, cellulases, hemicellulases, chitinases, amyloglucosidases, polygalacturonidases and mixtures thereof.

2. The process in accordance with claim 1 in which said enzyme is present in a weight concentration of within the ranges $\frac{1}{2000}\%$ to $2\%$.

3. The process in accordance with claim 1 in which said enzyme is a protease.

4. The process in accordance with claim 3 in which said enzyme is present in a weight concentration of within the ranges $\frac{1}{2000}\%$ to $2\%$.

5. The process in accordance with claim 1 in which said enzyme is a protease derived from *Bacilus subtilis*.

6. The process in accordance with claim 5 in which said enzyme is present in a weight concentration of within the ranges $\frac{1}{2000}\%$ to $2\%$.

References Cited by the Examiner

UNITED STATES PATENTS

| | | | |
|---|---|---|---|
| 2,259,419 | 10/1941 | Hefley et al. | 166—13 X |
| 2,343,136 | 2/1944 | Dobson et al. | 252—8.55 |
| 2,486,384 | 11/1949 | Beckman | 195—3 |
| 2,602,778 | 7/1952 | Snyder et al. | 252—8.55 |
| 2,681,704 | 6/1954 | Menaul | 166—22 |
| 2,843,545 | 7/1958 | Wolf | 252—8.55 |

OTHER REFERENCES

Uren: Petroleum Production Eingineering, Exploitation, 2d edition, McGraw-Hill Book Co., Inc., New York, 1939, p. 11 relied on.

CHARLES E. O'CONNELL, *Primary Examiner.*

S. J. NOVOSAD, *Assistant Examiner.*